United States Patent [19]

Andersen

[11] 4,216,645

[45] Aug. 12, 1980

[54] WOUND CABLE AND APPARATUS FOR FORMING CABLES

[75] Inventor: Axel Andersen, Gentofte, Denmark

[73] Assignee: Aktieselskabet Nordiske Kabel-OG Traadfabriker, Copenhagen, Denmark

[21] Appl. No.: 911,023

[22] Filed: May 31, 1978

[30] Foreign Application Priority Data

Jun. 6, 1977 [DK] Denmark .............................. 2491/77

[51] Int. Cl.³ .......................... D07B 1/16; H01B 7/20
[52] U.S. Cl. ......................................... 57/212; 57/13; 57/31; 57/235; 57/260; 174/102 D
[58] Field of Search ................. 57/200, 207, 210, 212, 57/235, 260, 239, 331, 311, 906, 6, 11, 13, 17, 18; 74/102 D, 102 R, 106 D, 107

[56] References Cited

U.S. PATENT DOCUMENTS

| | | | |
|---|---|---|---|
| 2,022,683 | 12/1935 | MacKinnon et al. | 57/235 X |
| 2,084,616 | 6/1937 | Johnson | 174/106 D |
| 2,087,303 | 2/1937 | Rosch et al. | 57/235 X |
| 2,121,942 | 6/1938 | Barrett | 174/102 D |
| 3,059,404 | 10/1962 | Benfer et al. | 57/13 X |
| 3,394,400 | 7/1968 | Lamons | 174/102 R |
| 3,413,792 | 12/1968 | Werdenberg | 57/212 X |
| 3,557,301 | 1/1971 | Priaroggia | 174/102 D |
| 3,604,192 | 9/1971 | Garner | 57/13 X |
| 3,701,840 | 10/1972 | Willmore | 174/102 D |
| 3,805,508 | 4/1974 | Maderna | 57/212 |
| 4,024,696 | 5/1977 | Townsend | 57/17 X |

*Primary Examiner*—Donald Watkins
*Attorney, Agent, or Firm*—Ladas & Parry

[57] ABSTRACT

An oblong cylindrical body such as an electrical or optical cable or a pipe having a concentric armour of spaced wires is provided with one or more binder tapes being provided with indentations such as corrugations or depressions in all or some of the spaces between the wires. The indentations may be produced by means of rollers having a surface in accordance with the desired indentations. The indentations may be produced before or after the application of the binder tape.

19 Claims, 10 Drawing Figures

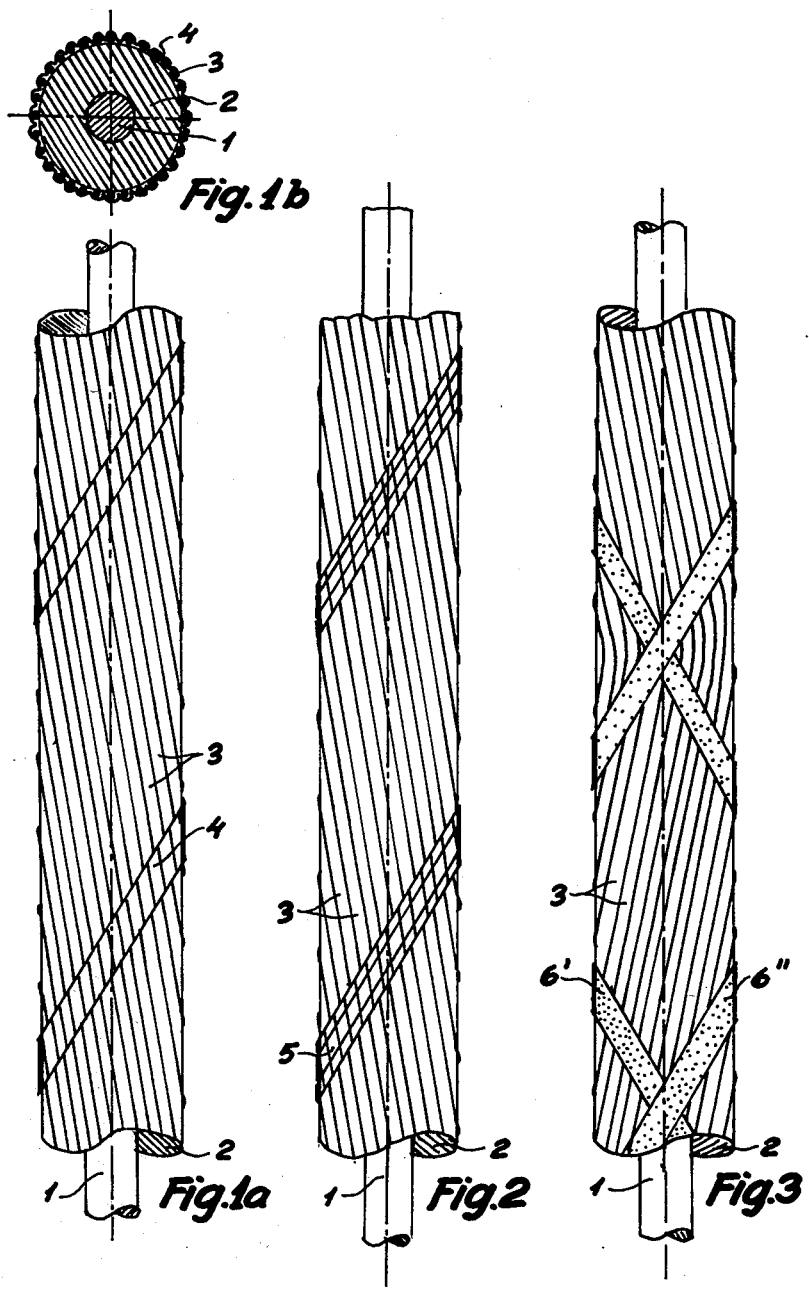

WOUND CABLE AND APPARATUS FOR FORMING CABLES

The present invention relates to an oblong cylindrical body, particularly an electrical or optical cable, of the type which is provided with a longitudinal concentric armour of wires which spaced apart are placed substantially parallel with the axis of the body or wound in S- or Z-helical-shape or in S-Z wave shape around the body, and one or more wound binder tapes and optionally an outer protective sheath, particularly of a thermoplastic polymeric material.

It is common knowledge to wind wires, for example of metal, nylon or other polymeric materials, on to cylindrical bodies, such as pipes and cables. Such wire windings may for example serve as armour of and/or relief of tensile stresses on the body and/or it may serve as an electrical screen in cables of various types.

Bodies according to the invention are thus for example electrical cables where the armour very often has an electrical function, because it acts as a zero conductor screen, or optical cables, but may also be for example tubes or pipes, such as waterpipes, where a wire armour is fitted to protect the pipes against pressure from the inside and/or damage from the outside, as is the case for example in water pipes and cables laid on the sea bed.

The invention will be described in more detail below in connection with electrical cables having a wire armour acting as a zero conductor screen, but apart from the specific conditions concerning electrical conductivity it may be used analogously on other cylindrical bodies.

Electrical cables having a concentric wire armour comprise according to the prior art often a core formed of one or more conductors which in a suitable manner is provided with an insulation layer and optionally an inner and outer semi-conductive layer. Metal wires are wound about the cable core either in a S- or Z-helical shape with or without periodic reversal of the direction of winding (S-Z wave shape) and pressed together to form a coherent socalled closed wire winding or are applied in a socalled closed wire winding with a certain distance between the individual wires which exceeds the diameter of the individual wire. In the latter case the wires may be secured by depression into the subjacent layer which must therefore be sufficiently resilient, or be held in place by means of a binder tape laid around the wires. It is also known to lay the wires to form rectilinear sections parallel with or slightly sloping with respect to the longitudinal axis of the cable, and periodically separated undulations disposed within each other, and whose sloping portions all either contact each other or are equidistantly spaced from each other, cf. the Danish Pat. No. 117 508.

These metal wires act as zero conductors and as a protective sheath for the cables. Between the metal wires and the cable core there is often inserted a layer of carbon paper or another semi-conductive material to provide electrical contact between the outer semi-conductive layer and the metal wires. The tape laid about the wires serves to hold the wires in place and also to create electrical contact between the individual wires. The outside of the cable is usually provided in a known manner with an insulating outer armour or plastic sheath.

The above electrical cables suffer from the drawback that the tape winding, often wound with opposite direction of winding with respect to the wire winding cannot maintain the wires in their positions during the repeated bendings to which the cables are normally subjected during the handling and laying of them. Therefore, the wires often overlap each other, or the result is a bigger or smaller distance, respectively, between the wires. As the cables must meet certain standards as regards the maximum permissible distances between the screen wires, it is often necessary to reject the cables due to the relative displacements of these screen wires.

To counteract the tendencies of wire displacements it is known to employ an expensive method which consists in inserting a layer of a semi-conductive adhesive material or a material having a large coefficient of friction between the cable core and the screen wires. This material is for example crimped carbon paper which firstly is often insufficient to maintain the position of the screen wires and secondly makes the production of cables more expensive. Such a layer also increases the rigidity of the cables. During repeated bendings of the cable the wires will thus either resist the bending and possibly crack, or they will shift on the adhesive layer, become deformed and not return to their original position.

The Danish Pat. No. 124 433 describes an electrical cable with a concentric zero conductor, comprising a central cable core consisting of one or more insulating conductors and a surrounding zero conductor in the form of undulated metal wires placed direct on the cable core and parallel with its axis, which patent attempts to obviate the drawbacks mentioned above by offsetting the undulating wires in relation to each other in the axial direction of the cable so as to provide mutual contact without overlapping on the sections of the one wave-sloping direction, while on the sections of the other wave-sloping direction there are provided spaces forming a strip running along a helical line having an even pitch around the cable core. Such a cable withstands repeated bendings owing to the above displacement of the undulated metal wires in the axial direction of the cable, whereby the wires in some portions accumulate under partial contact, but are spaced in other portions, which enables the wires to shift and to return to their original position after repeated bendings of the cable.

The spaces between the metal wires may be covered by a binder tape in the form of a smooth electrically conductive tape laid helically. Nor is this type of cable without drawbacks. Firstly, the specific construction with the relative displacement of the wave-shaped metal wires having a frequently reversing winding direction results in an increased consumption of materials in relation to a conventional S-Z winding, which due to the high prices of copper and aluminium is very disadvantageous. Secondly, the circumstance that the winding direction is not only periodically reversed, but that in the preferred embodiment with unsymmetrical wave-shape the size of the pitch is also changed in the two directions, necessitates a more complicated apparatus than conventional S-Z winding, and further, it is difficult to adjust periodically the speed of the winding means in practice because periodically wires with a relatively small pitch are to be applied. Nor is it possible to work with so high production rates as it is with cables having a greater wire pitch.

A further problem of the known smooth binder tapes is that they have a very small contact surface to the subjacent wires and exert a too small contact pressure to maintain the wires in their original relative positions when they are exposed to bending impacts, etc. Finally, when applying the outer protective sheath for example by extruding a thermoplastic material the binder tapes will tend to shift in an axial direction since they slide on the subjacent wires owing to the small contact surface between binder tape and wires.

The object of the present invention is to provide an oblong cylindrical body, such as an electrical cable, which does not suffer from the drawbacks mentioned above, and which thus inter alia can be produced at high production rates without the use of complicated apparatus and without additional expenses for materials as opposed to inter alia the above Danish Pat. No. 124 433, where the wire winding is changed. This is achieved according to the invention by employing one or more binder tapes provided before or after the application with indentations in all or some of the spaces between the armour wires. The indentations may have the shape of for example corrugations in substantially the entire width of the binder tape or series of domed or pyramidal depressions. The idea of using binder tapes with such depressions is that the depressions are flattened out in the regions where the tape contacts the subjacent wires because of the pressure, but are kept in the wire spaces, and thus maintain the wires spaced apart. This has the advantage that binder tapes with the same depressions may be used for cables with different wire spaces.

In the cases of an electrical cable where the wire armour this is a metallic screen, there may be employed a binder tape of an electrically conductive material, such as copper or aluminium. However, it is also possible to employ a non-conductive binder tape and to provide the electrical contact in other ways, for example by means of a longitudinal contact wire or contact tape disposed between the wires and the binder tape.

In electrical cables the binder taps may thus have a two-fold function, viz. to provide contact between the wires and to secure the wires so that they do not become displaced.

In both respects the binder tapes with indentations used according to the invention are particularly advantageous:

The indentations bring about a considerably better surface contact between tape and wires than that obtained by the known smooth tapes. To ensure this contact the indentations according to the invention have a depth that is smaller than or preferably approximately equal to the diameter of the subjacent wires.

As far as the securing is concerned the indentations result in an increase of the tightening of the tape in relation to the tightening with which the tape is laid owing to the provided, permanent deformation, and thus also a greater contact pressure against the wires than a smooth wire. This is, as explained above, particularly the case if the tape is not provided with indentations till after the application.

The binder tape may be laid both S and Z helically and advantageously immediately after the application of the subjacent wire armour and as close as possible to the winding centre. Dependent upon the course of the subjacent wires the binder tape will thus get the same, opposite or reversing direction of winding. If only one binder tape is used, it is preferably laid in a direction opposite to the armour. In case of an S-Z wave-shaped armour two oppositely laid binder tapes will often be used, depending upon the wire pitch.

An essential feature of the invention is that the indentations may be provided before as well as after the application of the binder tape about the wires. The choice between these possibilities depends upon several factors:

Firstly, the hardness of the subjacent layer is of importance. In respect of electrical cables-depending upon their structure and field of application-it will be a semi-conductive layer or an insulation layer for example of cross-linked polyethylene or butyl rubber. If it is desired to avoid depression of the metal wires into the subjacent layer a binder tape may be used which in advance is provided with indentations.

If the subjacent layer is so hard that there is no risk of the wires being depressed or if this is considered unimportant, the tape may be provided with indentations before as well as after the application. The choice also depends upon the type of the tape material. In terms of production the most simple method is to provide the indentations after the application, but some materials are too hard and crack or are so elastic that they cannot take-up the elongation imparted to them at a finishing treatment. Conclusively it may be said that materials which cannot be permanently deformed after the application must be pre-deformed.

A binder tape that is pre-deformed transversely may exhibit a greater flexibility and elasticity than a smooth binder tape deformed after the application, for which reason-other things being equal-it may be applied with a greater tightening than that obtained by deforming the tape after the application.

To achieve the desired securing of the wires it is of course important that they are wound in an open wire armour so as to offer space for the indentations. These indentations are very often placed so that there is one indentation for each wire space, however, it is also possible to provide one indentation for for example every second or third wire space. This depends inter alia upon the expected stresses to which the cable will be subjected, the size of the pitch of the binder tape as well as the wires and the number of binder tapes, it being possible for example when using several binder tapes to provide each of the tapes with identations for various wire spaces, and the nature of the subjacent layer, as well as the materials of which the binder tape and wire armour are made.

In many cases the indentations are provided along the entire surface of the cable to ensure an effective securing of all the wires. Dependent upon the wire pitch it is in some cases sufficient, however, to provide indentations along a portion of the surface, the only prerequisite being that all wires are periodically secured by the indentations.

The direction of the indentations may also be varied; they may be parallel with as well as deviate from the direction of the subjacent wires.

In a specific embodiment binder tapes may be used which are provided with longitudinal corrugations prior to the application, and which are then corrugated transversely after the application.

The invention also relates to an apparatus for use in the production of bodies according to the invention, and the apparatus of the invention is characterized by comprising two or more, preferably four, rollers whose surfaces are constituted by bodies of revolution produced by a circular generatrix whose radius is adapted to the diameter of the body over the armour wires.

The shape of the surfaces of the rollers characteristic of the invention may vary dependent upon whether the binder tape is to be provided with indentations before or after the application, and they must be made of a material whose hardness is adjusted to the hardness of the binder tape.

To provide indentations after the application the surface of the rollers are formed in dependence upon the desired indentations and may for example be provided with grooves or with elevations that may give domed or pyramidal depressions.

If the indentations are provided before the application of the binder tape it is important that they are pressed down into the spaces between the armour wires and also that any depressions located on top of the wires are smoothed out to ensure a satisfactory contact surface. For this purpose the rollers preferably have a smooth surface.

The invention will be illustrated in greater detail by the embodiments shown in the drawing in which FIG. 1a shows an electrical cable having screen wires in S-winding and binder tape in Z-winding, FIG. 1b is a cross sectional view of FIG. 1a, FIG. 2 shows a cable analogous to that of FIG. 1a, where the binder tape is provided with longitudinal corrugations before the application, FIG. 3 shows analogously a cable having screen wires in S-Z winding and two binder tapes having domed depressions in S-winding and Z-winding respectively, FIG. 4 is a sectional view of FIG. 1a, showing three wires and the binder tape, FIGS. 5 and 6 analogously with FIG. 4 show sections of FIGS. 2 and 3, FIG. 7 analogously with FIG. 5 shows three wires and a binder tape having many longitudinal corrugations.

FIGS. 8a and 8b show a longitudinal and cross section of an apparatus for use in the production of a cable according to the invention, where the binder tape is corrugated after the application.

In FIGS. 1a, 1b, 2 and 3 there is shown a cable comprising an electrical conductor 1 of Cu or Al and an insulation layer 2. About this layer screen wires are wound (armour wires) 3 which in FIGS. 1a and 2 are Z-wound and in FIG. 3 S-Z-wound.

FIG. 1a shows the binder tape 4 which is Z-wound and provided with transverse corrugations parallel with the pitch of the screen wires.

FIG. 2 shows analogously the binder tape 5 which prior to the application is provided with longitudinal corrugations and after the application with transverse corrugations.

In FIG. 3 are shown the S-Z wave-shaped screen wires 3 and the two binder tapes 6' and 6" on which there are shown domed depressions provided after the application. These will tend to mesh with each other at the points of intersection, which further contributes to the securing.

Figure 4:
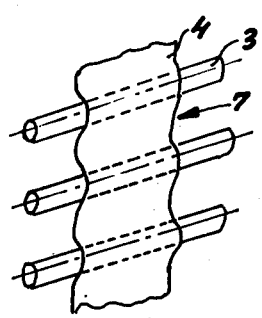
Figure 5:
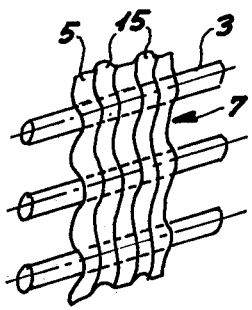
Figure 6:
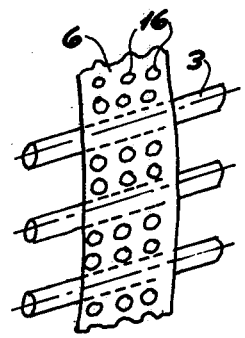

FIGS. 4, 5 and 6 show in more detail the securing of the wires with binder tape in the embodiments 4, 5 and 6' shown in FIGS. 1a, 2 and 3.

FIGS. 4 and 5 show the transverse corrugation 7, while FIG. 5 shows relatively deep longitudinal corrugations 15. Further, FIG. 6 shows the domed depressions 16. It will be seen that the depressions are flattened out where the binder tape contacts the armour wires 3.

Figure 7:
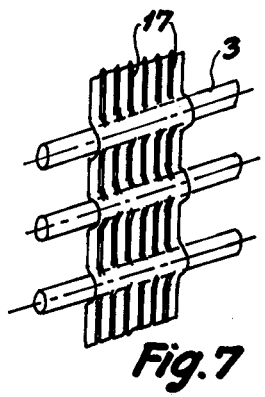

FIG. 7 shows a binder tape with many longitudinal corrugations 17 provided on the tape immediately before the application and which after the application is provided with transverse depressions. Unlike FIG. 5 the longitudinal corrugations are so small that they are smoothed out where the binder tape contacts the armour wires at the subsequent transverse corrugation.

Figure 8A:
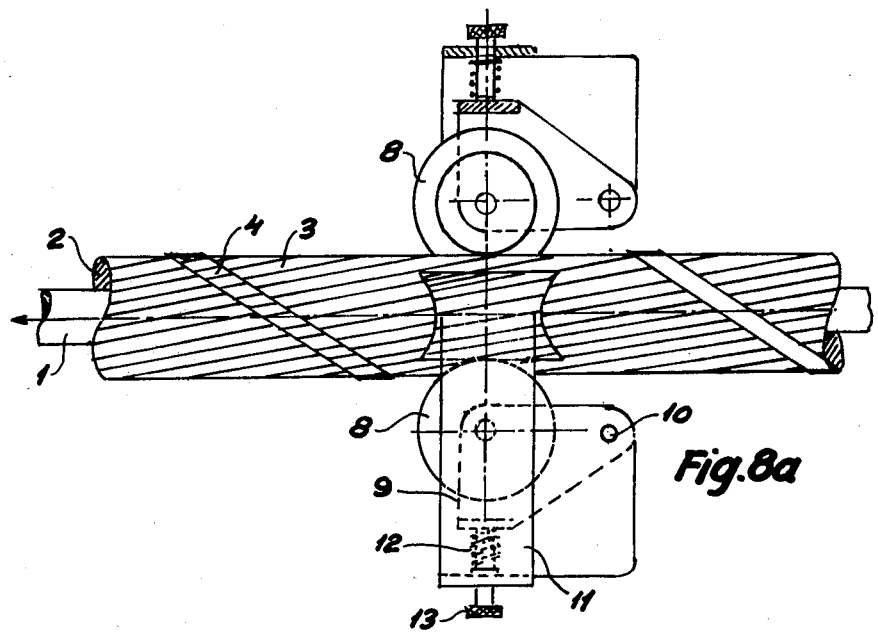
Figure 8B:
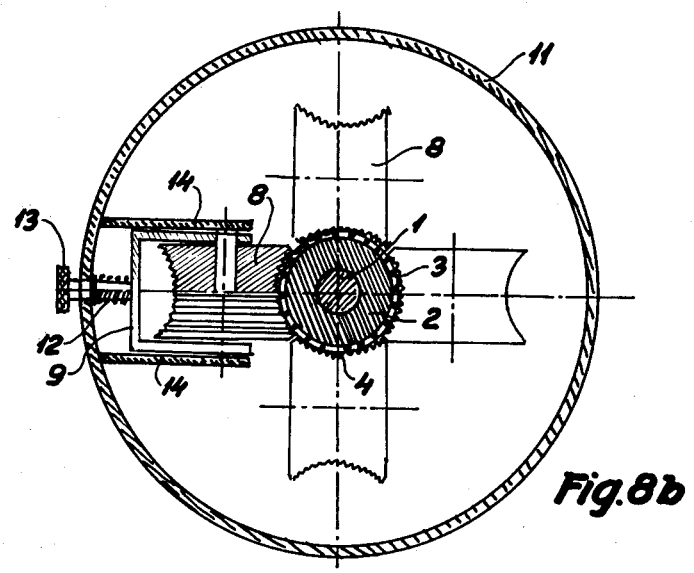

The apparatus shown in FIGS. 8a and 8b comprises four corrugation rollers 8 of a suitably hard material, for example rubber, which are profiled to the diameter of the cable in question over the armour wires 3. The rollers 8, which are grooved to give the binder tape 4 the desired depression, are mounted in a yoke 9 rotatable around the pin 10 attached to the yoke holder 14 in the ring 11. The corrugation rollers 8 are spring loaded by the springs 12. By means of adjustment screws 13 the rollers 8 may be adjusted so as to obtain the desired corrugation pressure against the cable.

By drawing the cable in the direction of the arrow (FIG. 8a) in relation to the corrugation apparatus, the binder tape 4 is corrugated. The apparatus may either be fixed or may rotate around the axis of the cable with a direction of rotation corresponding to the wire winding. In the first case a corrugation is obtained which runs substantially parallel with the axis of the cable and in the last case the indentations run parallel with the direction of the wires.

In the shown embodiment the rollers 8 are provided with grooves. They may alternatively be provided with elevations that may give domed or pyramidal depressions, or be smooth if a predeformed tape is applied.

What I claim is:

1. An oblong cylindrical body, which comprises a core of electrically conductive material, a layer of electrically-insulating material covering the core, a longitudinal concentric open armour of metallic wires and at least one superjacent binder tape of electrically-conductive material which is wound around the wires in an open winding and is provided with indentations in at least some of the open spaces between adjacent armour wires.

2. An oblong cylindrical body, which comprises a longitudinal concentric open armour of wires and at least one superjacent binder tape which is wound around the wires in an open winding and is provided with indentations in at least some of the open spaces between the armour wires.

3. The body according to claim 2, which further comprises an outer protective sheath.

4. The body according to claim 1 or 2, wherein the armour wires are placed substantially parallel with the axis of the body.

5. The body according to claim 1 or 2, wherein the armour wires are wound in S- helical shape around the body.

6. The body according to claim 1 or 2, wherein the armour wires are wound in Z-helical shape around the body.

7. The body according to claim 1 or 2, wherein the armour wires are wound in S-Z wave shape around the body.

8. The body according to claim 2, wherein said indentations in the binder tape in the regions over said wire spaces run substantially parallel with the direction of the subjacent wires.

9. The body according to claim 2, wherein said indentations in the regions over said wire spaces run in a direction deviating from that of the subjacent wires.

10. The body according to claim 9, wherein said indentations run in a direction substantially parallel with the axis of the body.

11. The body according to claim 2, wherein said indentations have a depth not exceeding the diameter of the subjacent wires.

12. The body according to claim 2, wherein said indentations are formed as corrugations extending uninterruptedly substantially in the entire width of the tape.

13. The body according to claim 2, wherein said indentations are formed as series of domed or pyramidal depressions.

14. The body according to claim 2, wherein the employed binder tape or tapes are further provided with longitudinal corrugations.

15. The body according to claim 2, wherein the indentations have been provided before the application of the binder tapes.

16. The body according to claim 2, wherein the indentations have been provided after the application of the binder tapes.

17. An apparatus for use in the production of bodies according to claim 2 which comprises at least two rollers for pressing the binder tape firmly against the wires, the rollers having surfaces which are constituted by bodies of rotation produced by a circular generatrix whose radius is adapted to the diameter of the body over the armour wires.

18. An apparatus according to claim 17 for use in the production of bodies where indentations are provided after the application of the binder tape or tapes, which comprises rollers having a surface shaped to produce the desired indentations.

19. An apparatus according to claim 17 for use in the production of bodies where the indentations in the binder tape or tapes are provided before the application, which comprises rollers having a smooth surface.

* * * * *